(12) United States Patent
Ke et al.

(10) Patent No.: US 12,027,725 B2
(45) Date of Patent: Jul. 2, 2024

(54) BATTERY PACK

(71) Applicant: ZHEJIANG LERA NEW ENERGY POWER TECHNOLOGY CO., LTD, Ningbo (CN)

(72) Inventors: Hengzhao Ke, Ningbo (CN); Jianhong Dai, Ningbo (CN)

(73) Assignee: ZHEJIANG LERA NEW ENERGY POWER TECHNOLOGY CO., LTD, Ningbo (CN)

( * ) Notice: Subject to any disclaimer, the term of this patent is extended or adjusted under 35 U.S.C. 154(b) by 0 days.

(21) Appl. No.: 18/034,083

(22) PCT Filed: Dec. 9, 2021

(86) PCT No.: PCT/CN2021/136888
§ 371 (c)(1),
(2) Date: Apr. 27, 2023

(87) PCT Pub. No.: WO2022/121993
PCT Pub. Date: Jun. 16, 2022

(65) Prior Publication Data
US 2023/0395948 A1 Dec. 7, 2023

(30) Foreign Application Priority Data

Dec. 10, 2020 (CN) .......................... 202022961394.0
Dec. 10, 2020 (CN) .......................... 202022966758.4
Dec. 10, 2020 (CN) .......................... 202022966844.5

(51) Int. Cl.
*H01M 50/519* (2021.01)
*H01M 50/202* (2021.01)
(Continued)

(52) U.S. Cl.
CPC ....... *H01M 50/519* (2021.01); *H01M 50/202* (2021.01); *H01M 50/244* (2021.01);
(Continued)

(58) Field of Classification Search
CPC ............ H01M 50/519; H01M 50/247; H01M 50/202; H01M 50/244; H01M 50/284; H01M 2220/30
See application file for complete search history.

(56) References Cited

U.S. PATENT DOCUMENTS

2014/0230835 A1 8/2014 Saliman

FOREIGN PATENT DOCUMENTS

| CN | 204303903 U | 4/2015 |
| CN | 208849025 U | 5/2019 |

(Continued)

OTHER PUBLICATIONS

JP2012109050A translation (Year: 2012).*

*Primary Examiner* — Jane J Rhee
(74) *Attorney, Agent, or Firm* — Bayramoglu Law Offices LLC

(57) ABSTRACT

A battery pack includes a housing; a battery cell, a framework and a circuit board that are connected sequentially in a radial direction of the battery cell; a first electrical connector and a second electrical connector that are respectively arranged at positive and negative electrodes in an axial direction of the battery cell and separately connected to the circuit board; and third electrical connectors that are connected to the circuit board and configured to be electrically connected to an electrical device to supply power from the battery cell to the electrical device through the third electrical connectors, where the battery cell, the framework and the circuit board that are integrally connected, the first electrical connector, the second electrical connector, and the third electrical connectors are in a limiting slide fit with the inner cavity of the housing.

16 Claims, 8 Drawing Sheets

(51) Int. Cl.
*H01M 50/244* (2021.01)
*H01M 50/247* (2021.01)
*H01M 50/284* (2021.01)

(52) U.S. Cl.
CPC ....... *H01M 50/247* (2021.01); *H01M 50/284* (2021.01); *H01M 2220/30* (2013.01)

(56) References Cited

FOREIGN PATENT DOCUMENTS

| | | |
|---|---|---|
| CN | 211352384 U | 8/2020 |
| CN | 112531271 A | 3/2021 |
| CN | 113571827 A | 10/2021 |
| CN | 113571828 A | 10/2021 |
| JP | 2012109050 A * | 6/2012 |

* cited by examiner

BATTERY PACK

CROSS REFERENCE TO THE RELATED APPLICATIONS

This application is the national phase entry of International Application No. PCT/CN2021/136888, filed on Dec. 9, 2021, which is based upon and claims priority to Chinese Patent Application No. 202022961394.0, filed on Dec. 10, 2020; Chinese Patent Application No. 202022966758.4, filed on Dec. 10, 2020; and Chinese Patent Application No. 202022966844.5, filed on Dec. 10, 2020, the entire contents of which are incorporated herein by reference.

TECHNICAL FIELD

The present disclosure relates to a battery pack.

BACKGROUND

To improve the versatility of power tools and make the working range of power tools not limited by the location of the socket, many cordless power tools emerged on the market. Cordless power tools are easy to carry and simple to operate and have multiple functions, which can greatly reduce labor intensity, improve work efficiency, and mechanize manual operation, and thus are widely used in construction, housing decoration, automobile, machinery, electric power, bridge, gardening, and other fields.

The conventional battery pack adapted to supply power to the cordless power tools adopts a complicated assembly structure to avoid shaking.

SUMMARY

The purpose of the present disclosure is to provide a battery pack with a simple assembly structure to effectively avoid internal shaking of the battery pack.

The present disclosure provides a battery pack including:
a housing;
a battery cell, a framework and a circuit board that are connected sequentially in a radial direction of the battery cell;
a first electrical connector and a second electrical connector that are respectively arranged at positive and negative electrodes in an axial direction of the battery cell and separately connected to the circuit board; and
a third electrical connector that is connected to the circuit board and configured to be electrically connected to an electrical device, to supply power from the battery cell to the electrical device through the third electrical connector.

The battery cell, the framework and the circuit board that are integrally connected, the first electrical connector, the second electrical connector, and the third electrical connector are in a limiting slide fit with the inner cavity of the housing.

Further, the battery cell, the framework and the circuit board that are integrally connected, the first electrical connector, the second electrical connector, and the third electrical connector are in a limiting slide fit with the inner cavity of the housing.

Further, the framework is provided with a protruding slide key linearly extending in a length direction of the framework, and the inner wall of the housing is correspondingly provided with a matching slide groove; or the framework is provided with a recessed slide groove linearly extending in a length direction of the framework, and the inner wall of the housing is correspondingly provided with a matching protruding slide key.

Further, the first electrical connector and the second electrical connector each transversely extend outward and bend to an outer surface of the framework and extend toward the circuit board to connect to the circuit board.

Further, the first electrical connector and the second electrical connector include extension segments extending in opposite directions along the axial direction of the battery cell, respectively, and the extension segments are maintained at a spacing of at least 2 mm from the circuit board.

Further, the first electrical connector and the second electrical connector include extension segments extending in opposite directions along the axial direction of the battery cell, respectively, and the extension segments are spaced apart from each other at a spacing of not less than 3 mm.

Further, the extension segments are maintained at a spacing of not greater than 4 mm from the circuit board.

Further, the framework extends in the axial direction of the battery cell and extends outward and protrudes in a direction perpendicular to the axial direction of the battery cell to form mounting portions.

The mounting portions are adapted to position, mount, and connect the battery cell and the circuit board, respectively.

The framework further includes an arc groove located between the mounting portions and extending in the axial direction of the battery cell.

The arc groove corresponds to an arc surface of the battery cell.

Further, the width of the arc groove is shorter than the outer diameter of the battery cell.

Compared with the prior art, the beneficial effects of the present disclosure are as follows:

In the technical solution, the battery cell, the framework, and the circuit board are connected sequentially in the radial direction of the battery cell. The battery cell is limited by the framework, and the positive and negative electrodes of the battery cell are connected to the circuit board through the first electrical connector and the second electrical connector. Two terminals of each of the first electrical connector and the second electrical connector are fixedly connected or, more specifically, welded to the battery cell and the circuit board to limit and connect the battery cell to the framework. The first electrical connector and the second electrical connector not only are electrically connected but also limited and fixed. In addition, the circuit board is directly fixed and limited to the framework, and the third electrical connector is fixed to the circuit board, such that the battery cell, the framework, the circuit board, the first electrical connector, the second electrical connector, and the third electrical connector are integrally connected. The integrated structure is in a limiting slide fit with the inner cavity of the housing. Therefore, assembly is simple and convenient, and the integrated structure is limited by the inner cavity to effectively prevent internal shaking of the battery pack.

The purpose of the present disclosure is to provide a battery pack to effectively avoid internal shaking of the battery pack.

The present disclosure provides a battery pack, including:
a housing;
a battery cell, a framework and a circuit board that are connected sequentially in a radial direction of the battery cell;

a first electrical connector and a second electrical connector that are respectively arranged at positive and negative electrodes in an axial direction of the battery cell and separately connected to the circuit board; and a third electrical connector that is connected to the circuit board and configured to be electrically connected to an electrical device, to supply power from the battery cell to the electrical device through the third electrical connector.

The framework is in a limiting slide fit with the inner cavity of the housing.

Further, the battery cell, the framework, the circuit board, the first electrical connector, the second electrical connector, and the third electrical connector are integrally connected.

Further, the framework is provided with a protruding slide key linearly extending in a length direction of the framework, and an inner wall of the housing is correspondingly provided with a matching slide groove; or the framework is provided with a recessed slide groove linearly extending in a length direction of the framework, and the inner wall of the housing is correspondingly provided with a matching protruding slide key.

Compared with the prior art, the beneficial effects of the present disclosure are as follows:

In the technical solution, the battery cell, the framework, and the circuit board are connected sequentially in the radial direction of the battery cell, and the battery cell and the circuit board are limited by the framework. After the limiting connection is in place, the limiting slide fit between the framework and the inner cavity of the housing can effectively avoid internal shaking of the battery pack.

BRIEF DESCRIPTION OF THE DRAWINGS

To describe the technical solutions in the specific implementations of the present disclosure or the prior art more clearly, the accompanying drawings required for describing the specific implementations or the prior art are briefly described below. The accompanying drawings in the following description show merely some implementations of the present disclosure, and those of ordinary skill in the art may still derive other drawings from these accompanying drawings without creative efforts.

DETAILED DESCRIPTION OF THE EMBODIMENTS

The following clearly and completely describes the technical solutions of the present disclosure with reference to the accompanying drawings. The described examples are merely some, rather than all examples of the present disclosure. All other embodiments derived from the embodiments in the present disclosure by those of ordinary skill in the art without creative efforts shall fall within the protection scope of the present disclosure.

Embodiment 1

Figure 1:
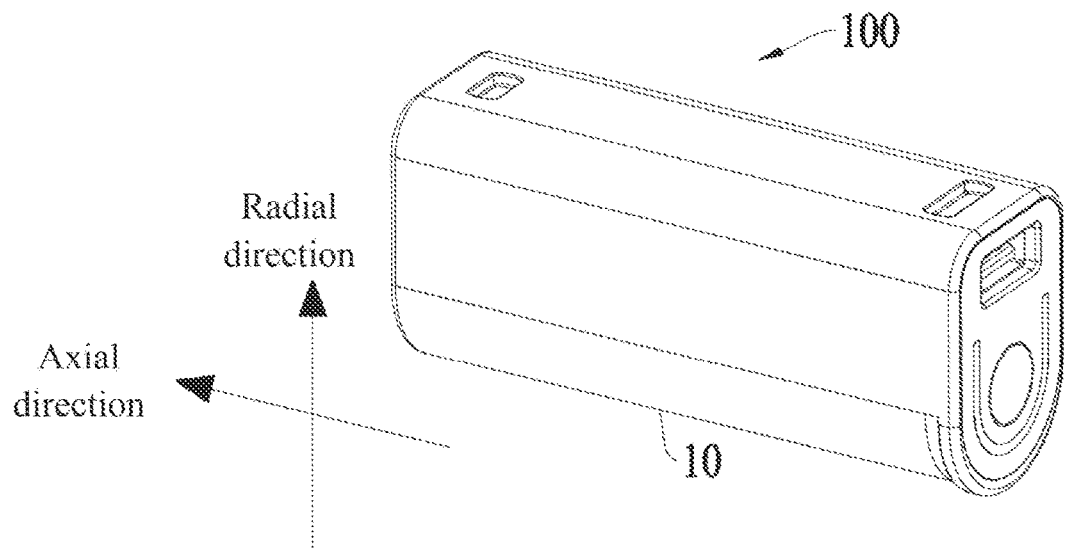
FIG. 1 is a schematic diagram of the structure of embodiment 1 according to the present disclosure.
Figure 2:
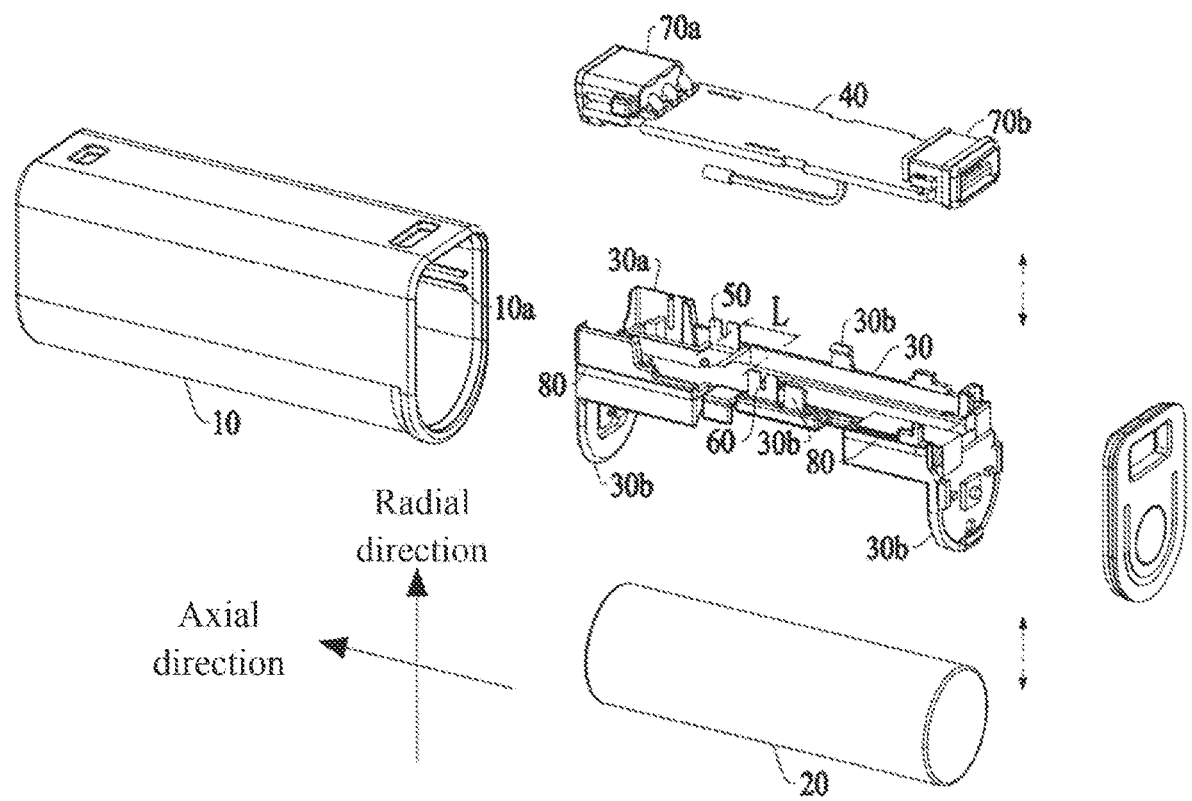
FIG. 2 is an exploded view of the structure of embodiment 1 according to the present disclosure.
Figure 3:
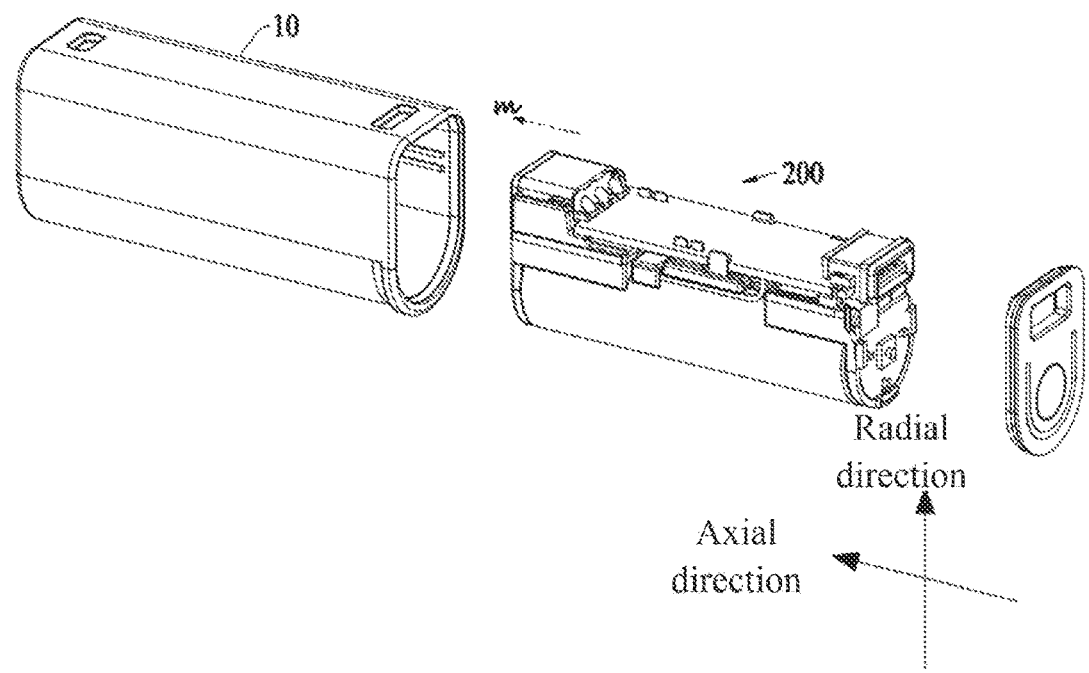
FIG. 3 is a schematic diagram of the structural assembly of embodiment 1 according to the present disclosure.

Referring to FIGS. 1-3, battery pack 100 includes housing 10, battery cell 20, framework 30, and circuit board 40. The battery cell 20, the framework 30, and the circuit board 40 are connected sequentially in a radial direction of the battery cell 20. The battery pack 100 further includes:

first electrical connector 50 and second electrical connector 60 that are respectively arranged at positive and negative electrodes in an axial direction of the battery cell 20 and separately connected to the circuit board 40 and third electrical connectors (70a and 70b) that are connected to the circuit board 40 and configured to be electrically connected to an electrical device to supply power from the battery cell 20 to the electrical device through the third electrical connectors (70a and 70b).

The battery cell 20, the framework 30 and the circuit board 40 that are integrally connected, the first electrical connector 50, the second electrical connector 60, and the third electrical connectors (70a and 70b) are in a limiting slide fit with the inner cavity of the housing 10.

The battery cell 20 is limited by the framework 30, and the positive and negative electrodes of the battery cell 20 are connected to the circuit board 40 through the first electrical connector 50 and the second electrical connector 60. Two terminals of each of the first electrical connector 50 and the second electrical connector 60 are fixedly connected or, more specifically, welded to the battery cell 20 and the circuit board 40 to limit and connect the battery cell 20 to the framework 30.

The first electrical connector 50 and the second electrical connector 60 not only are electrically connected, but also limited and fixed. In addition, the circuit board 40 is directly fixed to the framework 30. Referring to FIG. 2, the framework 30 is provided with protruding lock structures 30b to directly fix and limit the circuit board 40 to the framework 30. Certainly, the framework 30 is correspondingly provided with a mounting position for the circuit board 40. After the circuit board matches the mounting position, the protruding lock structure 30b limits and fixes the circuit board to the framework 30.

The third electrical connectors (70a and 70b) are fixed to the circuit board 40, such that the battery cell 20, the framework 30, the circuit board 40, the first electrical connector 50, the second electrical connector 60, and the third electrical connectors (70a and 70b) are integrally connected. The integrated structure, shown as 200 in FIG. 3, is in a limiting slide fit with the inner cavity of the housing 10. Therefore, assembly is simple and convenient, and the integrated structure is limited by the inner cavity to effectively prevent internal shaking of the battery pack.

The battery cell 20, the framework 30 and the circuit board 40 that are integrally connected, the first electrical connector 50, the second electrical connector 60, and the third electrical connectors (70a and 70b) are in a limiting slide fit with the inner cavity of the housing 10 in the axial direction of the battery cell 20.

As shown in FIG. 2, the battery cell 20, the framework 30, and the circuit board 40, the first electrical connector 50, the second electrical connector 60, and the third electrical connectors (70a and 70b) are combined to form the integrated structure 200. During assembly, the integrated structure 200 is wholly inserted into the inner cavity of the housing 10 in the direction shown by the arrow m, and an end cover is used for seal.

As shown in FIG. 2, the framework 30 is provided with protruding slide key 80 linearly extending in the length direction of the framework 30, and the inner wall of the housing 10 is correspondingly provided with matching slide groove 10a; or
  the framework 30 is provided with a recessed slide groove linearly extending in the length direction of the framework 30, and the inner wall of the housing 10 is correspondingly provided with a matching protruding slide key.

The battery cell 20, the framework 30, the circuit board 40, the first electrical connector 50, the second electrical connector 60 and the third electrical connectors (70a and 70b) are combined to form the integrated structure 200, substantially free of displacement from each other. During assembly, the protruding slide key 80 linearly extending in the length direction of the framework 30 is linearly inserted into the matching slide groove on the inner wall of the housing 10. In this way, the integrated structure 200 and the housing 10 form a connection structure without displacement, which is further sealed with the end cover. Therefore, no shaking is generated inside the battery pack.

In addition, the first electrical connector 50 and the second electrical connector 60 each transversely extend outward and bend to an outer surface of the framework 30 and extend toward the circuit board 40 to connect with the circuit board 40.

Figure 4:
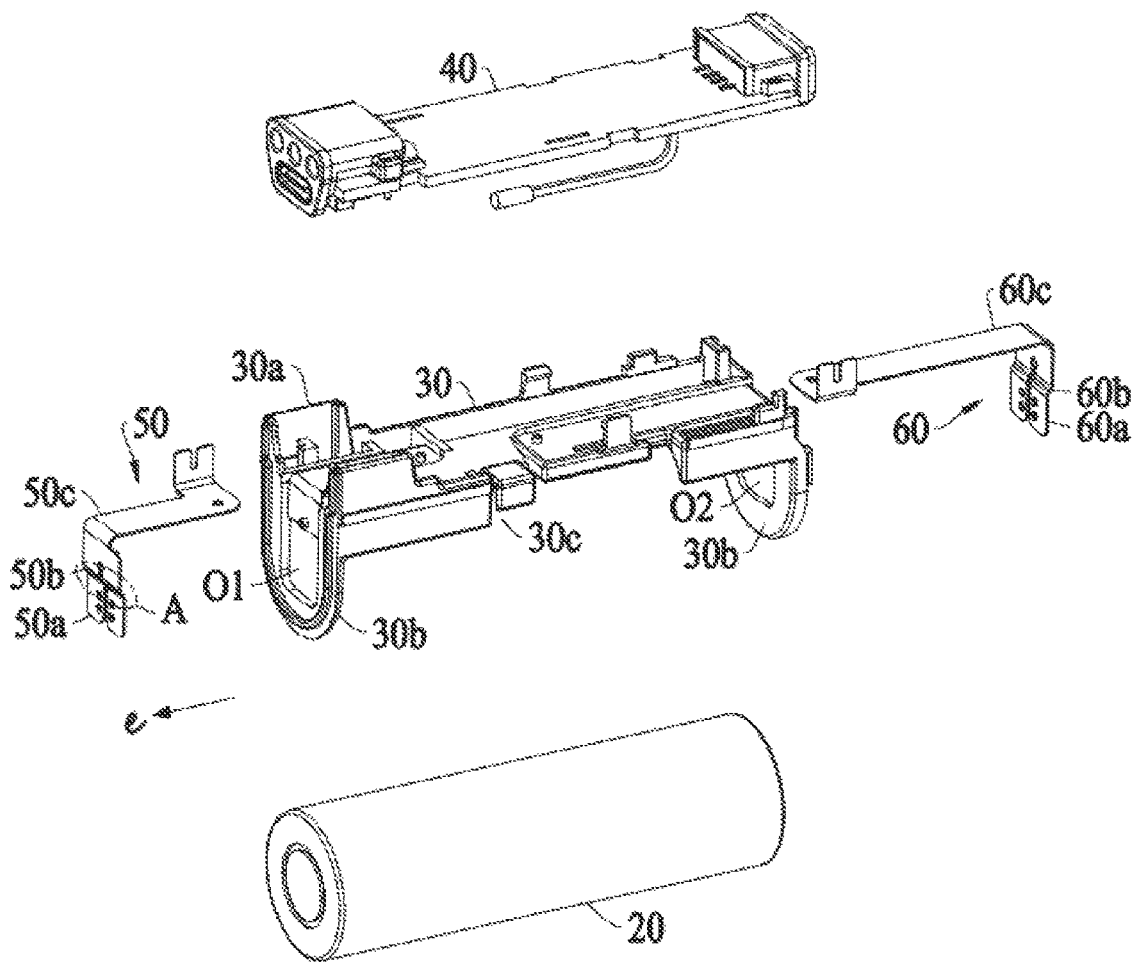
FIG. 4 is an exploded view of a partial structure of embodiment 1 according to the present disclosure.
Figure 5:
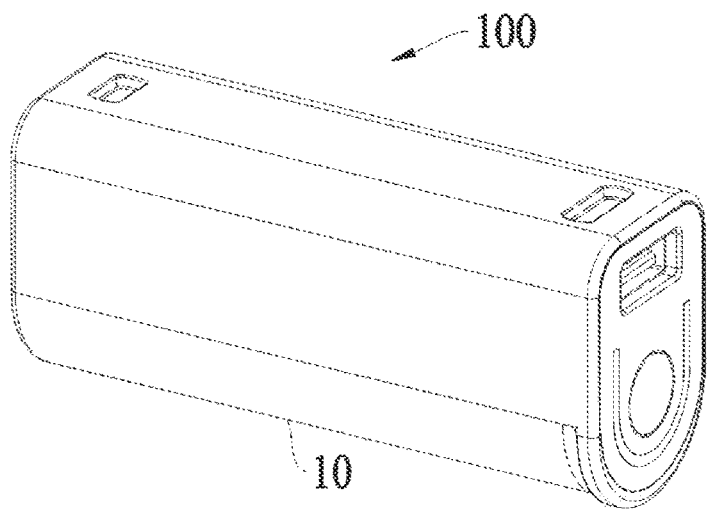
FIG. 5 is a stereoscopic view of the structure of embodiment 2 according to the present disclosure.

Specifically, referring to FIG. 4, the battery cell 20 is positioned inside the framework 30, and the framework 30 is provided with connection openings O1 and O2 corresponding to two electrodes of the battery cell 20. Starting terminals of the first electrical connector 50 and the second electrical connector 60 are electrically connected to the two electrodes of the battery cell 20 at the connection openings O1 and O2. Specifically, the first electrical connector 50 and the second electrical connector 60 adopt nickel sheets and are spot welded to the two electrodes of the battery cell 20, and a spot-welded portion is shown as spot welded segment 50a in FIG. 4.

The first electrical connector 50 and the second electrical connector 60 each extends in an outward transverse direction e and bends to attach to the outer surface of the framework 30 and extends toward the circuit board 40 to connect with the circuit board 40. The first electrical connector 50 and the second electrical connector 60 each extends in the outward transverse direction e and bends to form transverse extension and bending segment 50b, as shown in area A in FIG. 4.

Through the above structure design, the first electrical connector 50 and the second electrical connector 60 are spaced apart from the skin of the battery cell, and the first electrical connector 50 and the second electrical connector 60 are connected to the electrodes of the battery cell 20, which are conductive materials. The support framework 30 in this technical solution is an insulating material. Therefore, the insulating material separates the conductive first electrical connector 50 and the second electrical connector 60 from the skin of the battery cell 20. In this way, even if the skin of the battery cell 20 is broken, no short-circuit accident will occur, thereby achieving insulation protection.

In addition, since the battery pack 100 is suitable for the power tools and great vibration is usually generated during the use of the power tools, when the first electrical connector 50 and the second electrical connector 60 each extends in the outward transverse direction e and bends to form the transverse extension and bending segments, vibration can be effectively attenuated to prevent the significant vibration from affecting the internal structure during the use of the power tools.

Further, still referring to FIGS. 2 and 4, the first electrical connector 50 and the second electrical connector 60 respectively include extension segment 50c and extension segment 60c extending in opposite directions along the axial direction of the battery cell 20, and the extension segments 50c and 60c are maintained at a spacing of at least 2 mm from the circuit board 40.

Since both the first electrical connector 50 and the second electrical connector 60 are made of conductive materials, maintaining the extension segments 50c and 60c at a spacing of at least 2 mm from the circuit board 40 can effectively prevent the first electrical connector 50 and the second electrical connector 60 from contacting electronic components on the circuit board 40.

Further, the extension segments 50c and 60c are maintained at a spacing of not greater than 4 mm from the circuit board 40 to avoid a large height of the battery pack in the radial direction and ensure a compact structure of the battery pack.

In addition, to ensure the electrical safety of the battery pack, the first electrical connector 50 and the second electrical connector 60 respectively include extension segment 50c and extension segment 60c extending in opposite directions along the axial direction of the battery cell 20, and the extension segments 50c and 60c are spaced apart from each other at spacing L of not less than 3 mm.

Referring to FIGS. 2 and 4, the framework 30 extends in the axial direction of the battery cell 20 and extends outward in a direction perpendicular to the axial direction of the battery cell 20 to form mounting portions (30a and 30b).

The mounting portions 30a and 30b are adapted to position, mount, and connect the battery cell 20 and the circuit board 40.

Specifically, the mounting portion 30a is adapted to position and mount the circuit board 40 to which the third electrical connectors (70a and 70b) are fixed. The upwardly protruding portion of the mounting portion 30a at least partially wraps a side of the third electrical connectors (70a and 70b).

The mounting portions 30b are adapted to position and mount the battery cell 20. Specifically, two mounting portions 30b are provided to correspond to the two electrodes of the battery cell 20, and the two opposite mounting portions 30b are arranged in the axial direction of the battery cell 20 to limit the battery cell 20 in the axial direction.

Further, the framework 30 further includes an arc groove 30c located between the mounting portions 30b and extending in the axial direction of the battery cell 20. The arc groove 30c corresponds to an arc surface of the battery cell 20, and the arc groove 30c is combined with the inner wall of the housing 10 to limit the battery cell in the radial direction.

Moreover, the width of the arc groove 30c is smaller than the outer diameter of the battery cell 20 to minimize the radial width of the battery pack and the external size of the battery pack.

Embodiment 2

Referring to FIGS. 5-11, battery pack 100 includes battery cell 20, circuit board 40, first electrical connector 50, and second electrical connector 60. The circuit board 40 is spaced apart from the battery cell 20. The first electrical connector 50 is arranged at one terminal of the battery cell 20 and connected to the circuit board 40. The second electrical connector 60 is arranged at the other terminal of the battery cell 20, connected to the circuit board 40, and spaced apart from the first electrical connector 50 with a spacing L of not less than 3 mm.

The battery cell 20 preferably adopts the 21700 battery or the 18650 battery. The first electrical connector 50 and the second electrical connector 60 are made of conductive materials, preferably nickel sheets, and the first electrical connector 50 and the second electrical connector 60 are preferably connected to the positive and negative electrodes of the battery cell through spot welding.

Specifically, the battery cell 20 is limited by the framework 30, and the positive and negative electrodes of the battery cell 20 are connected to the circuit board 40 through the first electrical connector 50 and the second electrical connector 60. Two terminals of each of the first electrical connector 50 and the second electrical connector 60 are fixedly connected or, more specifically, welded to the battery cell 20 and the circuit board 40 to limit and connect the battery cell 20 to the framework 30.

Figure 9:
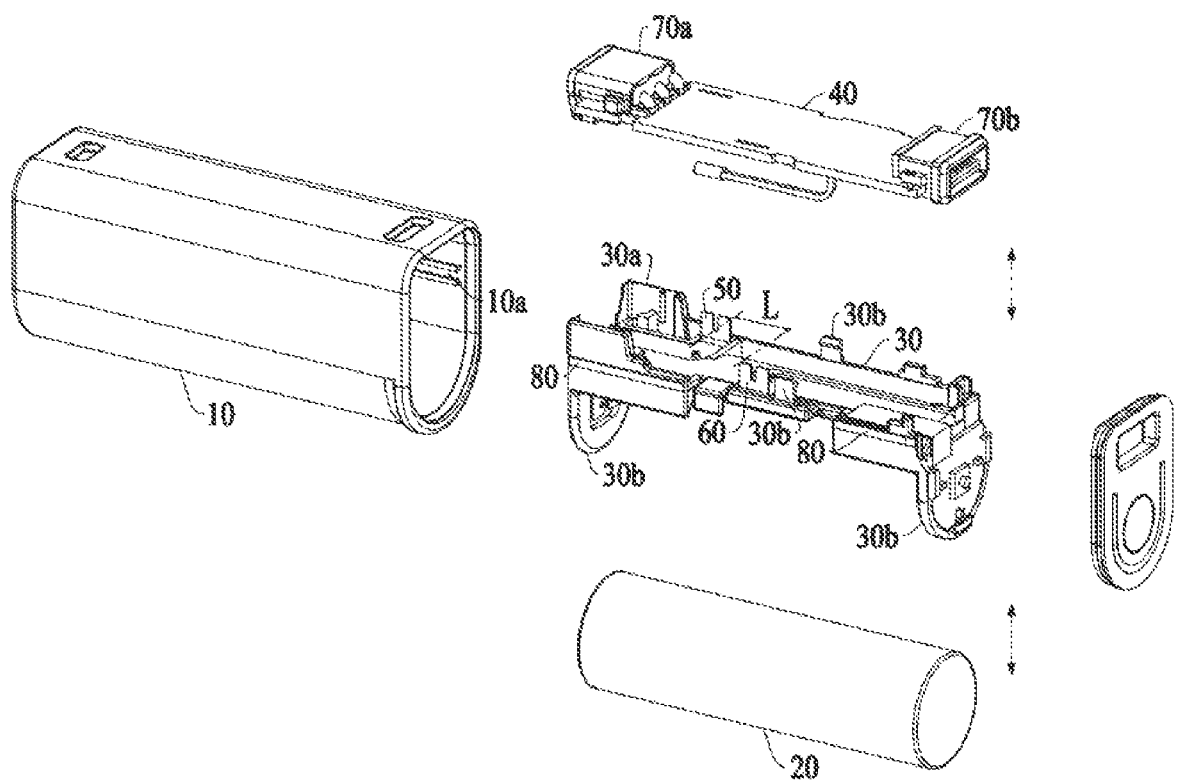
FIG. 9 is another exploded view of the structure of embodiment 2 according to the present disclosure.

The first electrical connector 50 and the second electrical connector 60 not only are electrically connected but also limited and fixed. In addition, the circuit board 40 is directly fixed to the framework 30. Referring to FIG. 9, the framework 30 is provided with protruding lock structure 30b to directly fix and limit the circuit board 40 to the framework 30. Certainly, the framework 30 is correspondingly provided with a mounting position for the circuit board 40. After the circuit board matches the mounting position, the protruding lock structure 30b fixes the circuit board to the framework 30.

In the technical solution, the first electrical connector and the second electrical connector correspondingly connected to the positive and negative electrodes of the battery cell are connected to the circuit board and are spaced on the circuit board. In addition, the spacing is at least 3 mm, which can effectively ensure the discharge safety of the battery pack.

Figure 10:
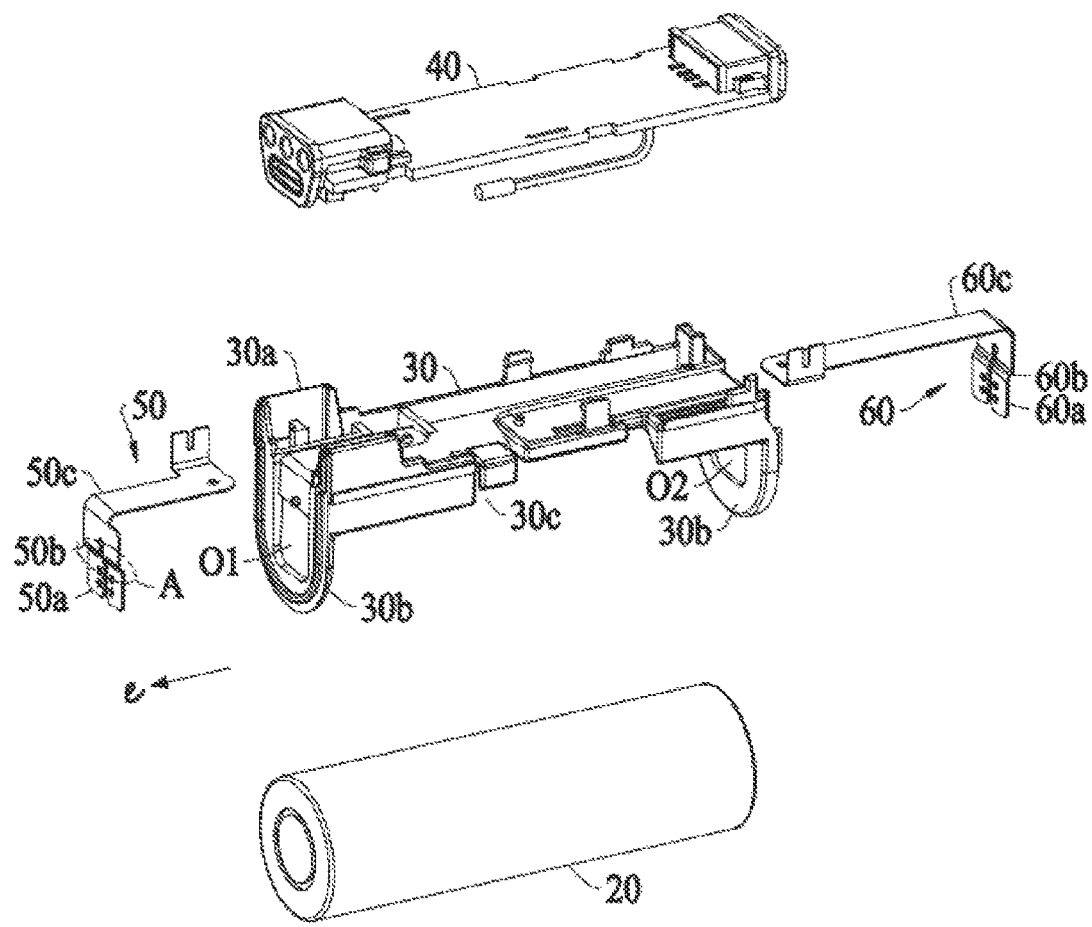
FIG. 10 is a schematic diagram of an exploded structure of a battery cell, a framework, and a circuit board of embodiment 2 according to the present disclosure.

Referring to FIGS. 9 and 10, the first electrical connector 50 and the second electrical connector 60 extend in opposite directions along the axial direction of the battery cell 20.

The battery cell 20 is positioned inside the framework 30, and the framework 30 is provided with connection openings O1 and O2 corresponding to two electrodes of the battery cell 20. Starting terminals of the first electrical connector 50 and the second electrical connector 60 are electrically connected to the two electrodes of the battery cell 20 at the connection openings O1 and O2. Specifically, the first electrical connector 50 and the second electrical connector 60 adopt nickel sheets and are spot welded to the electrodes of the battery cell 20, and a spot-welded portion is shown as spot welded segment 50a in FIG. 10.

The first electrical connector 50 and the second electrical connector 60 each extends in an outward transverse direction e and bends to attach to an outer surface of the framework 30 and extends toward the circuit board 40 to connect with the circuit board 40. The first electrical connector 50 and the second electrical connector 60 each extends in the outward transverse direction e and bends to form transverse extension and bending segment 50b, as shown in area A in FIG. 10.

Through the above structural design, the first electrical connector 50 and the second electrical connector 60 are spaced apart from the skin of the battery cell, and the first electrical connector 50 and the second electrical connector 60 are connected to the electrodes of the battery cell 20, which are conductive materials. The support framework 30 in this technical solution is an insulating material. Therefore, the insulating material separates the conductive first electrical connector 50 and the second electrical connector 60 from the skin of the battery cell 20. In this way, even if the skin of the battery cell 20 is broken, no short-circuit accident will occur, thereby achieving insulation protection.

In addition, since the battery pack 100 is suitable for the power tools and great vibration is usually generated during the use of the power tools, when the first electrical connector 50 and the second electrical connector 60 each extends in the outward transverse direction e and bends to form the transverse extension and bending segments, vibration can be effectively attenuated to prevent the significant vibration from affecting the internal structure during the use of the power tools.

Figure 11:
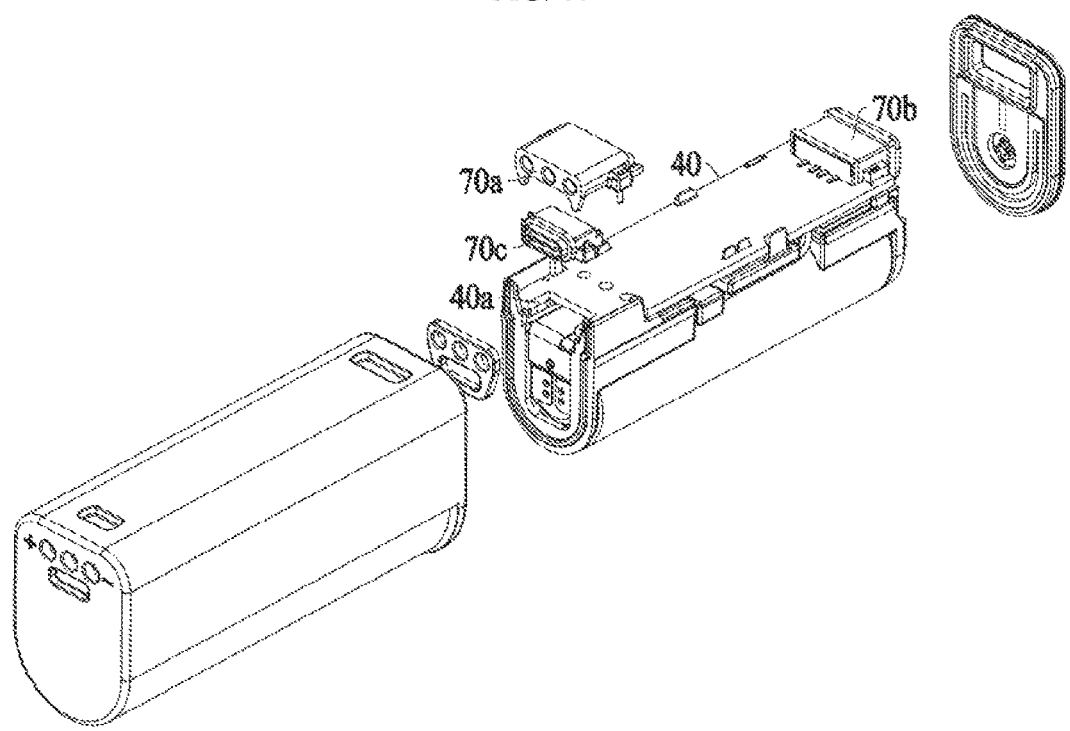
FIG. 11 is an exploded view from another perspective of the structure of embodiment 2 according to the present disclosure.

Still referring to FIGS. 9-11, the battery pack 100 further includes third electrical connectors (70a and 70b) that are arranged on the circuit board 40 adjacent to the first electrical connector 50 and the second electrical connector 60 and configured to be electrically connected to an electrical device to supply power from the battery cell 20 to the electrical device through the third electrical connectors (70a and 70b).

Figure 6:
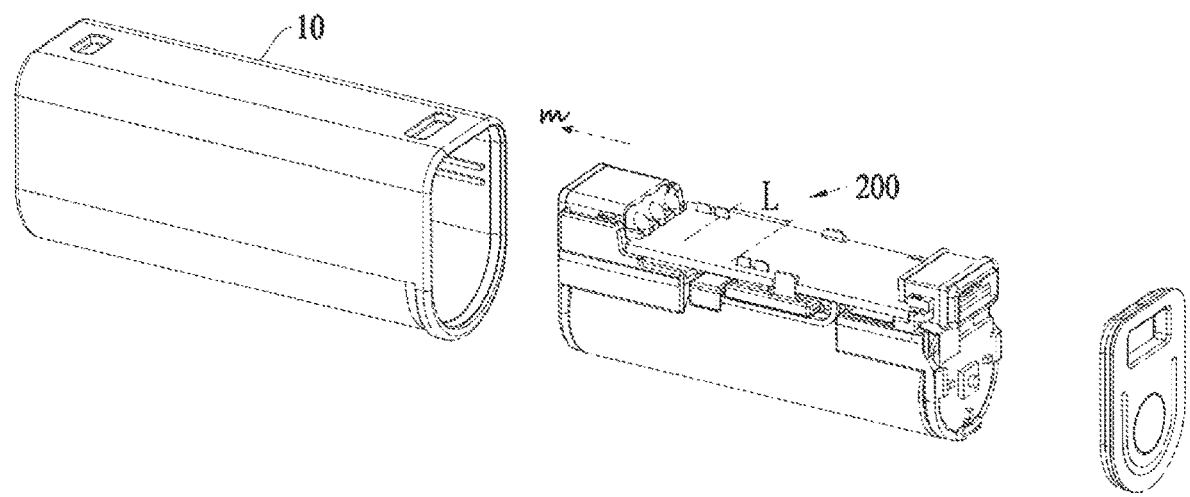
FIG. 6 is an exploded view of the structure of embodiment 2 according to the present disclosure.
Figure 7:
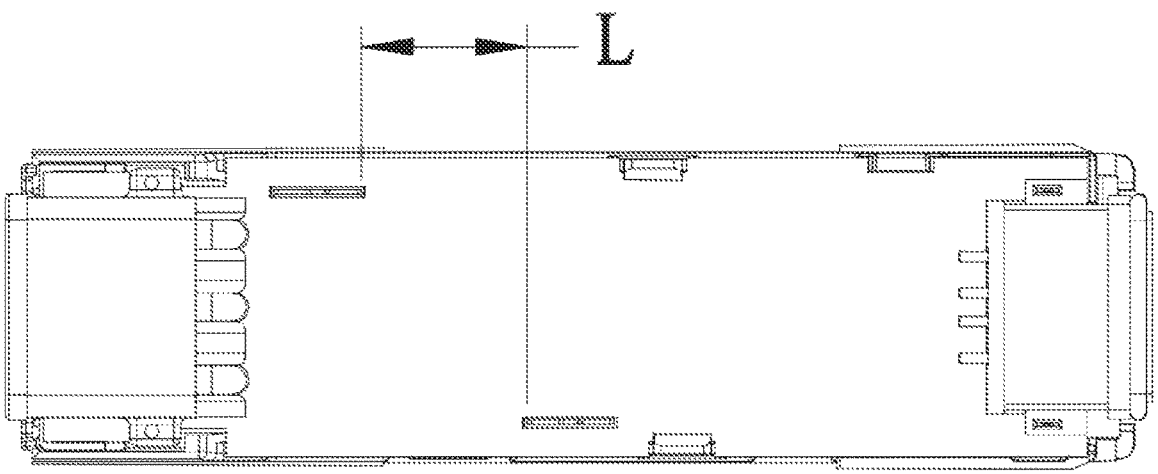
FIG. 7 is a top view of the structure of embodiment 2 according to the present disclosure.

The third electrical connectors (70a and 70b) are fixed to the circuit board 40, such that the battery cell 20, the framework 30, the circuit board 40, the first electrical connector 50, the second electrical connector 60, and the third electrical connectors (70a and 70b) are integrally connected. The integrated structure, shown as 200 in FIG. 6, is in a limiting slide fit with the inner cavity of the housing 10. Therefore, the assembly is simple and convenient, and the integrated structure is limited by the inner cavity to effectively prevent internal shaking of the battery pack.

Specifically, the third electrical connectors (70a and 70b) include both USB interface 70b suitable for 3C electronic products and high-current discharge terminal 70a suitable for power tools.

The third electrical connectors (70a and 70b) include a pair of adjacent electrical connectors, and the pair of adjacent electrical connectors provide positive and negative electrodes. In particular, the third electrical connector 70a is suitable for power tools and includes a pair of adjacent electrical connectors, and the pair of adjacent electrical connectors provide positive and negative electrodes.

Figure 8:
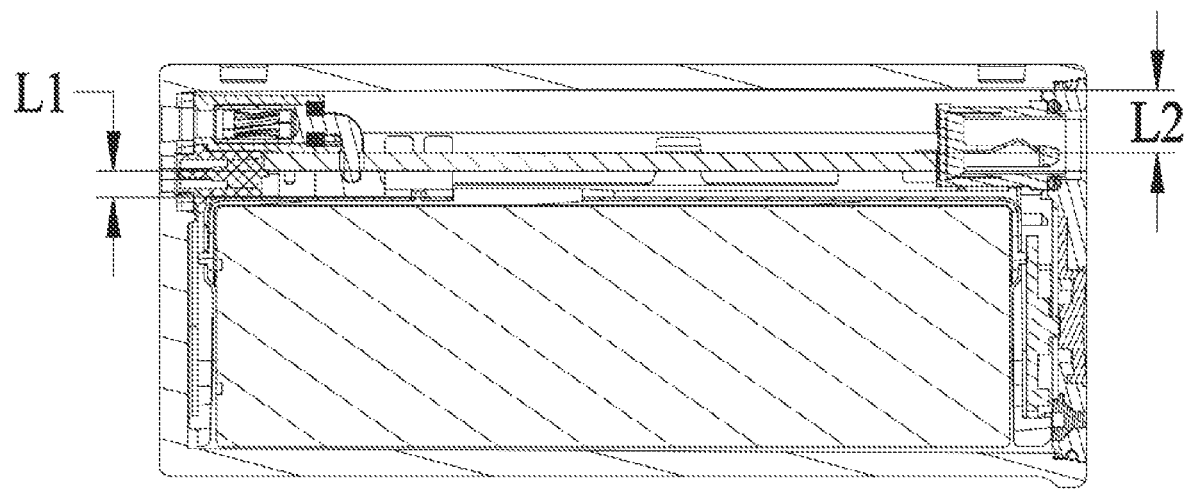
FIG. 8 is a longitudinal cross-sectional view of embodiment 2 according to the present disclosure.

Referring to FIGS. 8-10, the battery pack 100 includes the battery cell 20, the circuit board 40, the first electrical connector 50, and the second electrical connector 60. The first electrical connector 50 is arranged at one terminal of the battery cell 20 and connected to the circuit board 40. The second electrical connector 60 is arranged at the other terminal of the battery cell 20, connected to the circuit board 40, and spaced apart from the first electrical connector 50. The first electrical connector 50 and the second electrical connector 60 respectively include extension segment 50c and extension segment 60c extending in opposite directions along the axial direction of the battery cell 20, and the extension segments 50c and 60c are maintained at a spacing of at least 2 mm from the circuit board 40, that is, L1≥2 mm.

In the technical solution, the first electrical connector and the second electrical connector correspondingly connected to the positive and negative electrodes of the battery cell extend to the circuit board, and the first electrical connector and the second electrical connector are prevented from contacting the electronic components on the circuit board to avoid short circuit. Therefore, the extension segments of the first electrical connector and the second electrical connector are maintained at a spacing of at least 2 mm from the circuit board to ensure the discharge safety of the battery pack.

Further, to minimize the overall size of the battery pack and ensure the compact structure of the battery pack, the extension segment 50c and extension segment 60c are maintained at a spacing of 4 mm from the circuit board 40, that is, L154 mm.

In addition, referring to FIG. 11, the battery pack 100 further includes a fourth electrical connector 70c, and the circuit board 40 is provided with a corresponding mounting opening 40a. The fourth electrical connector 70c is inserted in the mounting opening 40a and is substantially flush with the upper surface of the circuit board 40. The fourth electrical connector 70c is configured to be connected to a charging source to supply power to the battery cell 20 through the fourth electrical connector 70c.

The above fourth electrical connector 70c preferably adopts a bi-directional charge/discharge interface, such as a type-c interface. Power can be charged to the battery cell 20 through the type-c interface and can be discharged to 3C electrical devices through the type-c interface.

In addition, the battery pack 100 further includes third electrical connector 70a connected to the circuit board 40 and adjacent to the fourth electrical connector 70c. The third electrical connector 70a is located above and parallel to the fourth electrical connector 70c and is configured to be electrically connected to the electrical device to supply power from the battery cell 20 to the electrical device through the third electrical connector 70a.

The third electrical connector 70a is suitable for power tools, which preferably adopt a pin terminal. The pin terminal includes at least a pair of adjacent electrical connectors, and the pair of adjacent electrical connectors provide positive and negative electrodes for high current discharge.

Still referring to FIGS. 8-10 and FIG. 11, the battery pack 100 includes: the housing 10, and the battery cell 20 and the circuit board 40 disposed in the housing 10;
    the first electrical connector 50 arranged at one terminal of the battery cell 20 and connected to the circuit board 40;
    the second electrical connector 60 arranged at the other terminal of the battery cell 20 and connected to the circuit board 40;
    the third electrical connectors (70a and 70b) that are configured to be electrically connected to an electrical device, to supply power from the battery cell 20 to the electrical device through the third electrical connectors (70a and 70b); and
    the fourth electrical connector 70c configured to be connected to a charging source, to supply power to the battery cell 20 through the fourth electrical connector 70c.

The third electrical connectors (70a and 70b) and the fourth electrical connector 70c are connected to the same side of the circuit board 40. The circuit board 40 is maintained at a spacing of at least 2 mm from the first electrical connector 50 and/or the second electrical connector 60 that are opposite to and below the circuit board 40. The circuit board 40 is maintained at a spacing of not greater than 7 mm from the inner wall of the housing 10 that is opposite to and above the circuit board 40.

The circuit board 40 is maintained at a spacing of not greater than 4 mm from the first electrical connector 50 and/or the second electrical connector 60 that are opposite to and below the circuit board 40.

The circuit board 40 is maintained at a spacing of at least 5 mm from the inner wall of the housing 10 that is opposite to and above the circuit board 40.

In the technical solution, the extension segments of the first electrical connector and the second electrical connector are maintained at a spacing of at least 2 mm from the circuit board to ensure the discharge safety of the battery pack. In addition, in the technical solution, the third electrical connector and the fourth electrical connector are disposed. The third connector is configured to be electrically connected to the electrical device to supply power from the battery cell to the electrical device through the third electrical connector. The fourth electrical connection is configured to be connected to the charging source to supply power to the battery cell through the fourth electrical connector. In addition, the third electrical connector and the fourth electrical connector are connected to the same side of the circuit board, and the circuit board is maintained at a spacing of not greater than 7 mm from the inner wall of the housing that is opposite to and above the circuit board to minimize the overall size of the battery pack, while not affecting the layout of the third electrical connector and the fourth electrical connector.

Embodiment 3

Further, referring to FIGS. 12-16, battery pack 100 includes battery cell 20, framework 30, and first circuit board 40a. The battery cell 20, the framework 30, and the first circuit board 40a are connected sequentially in a radial direction of the battery cell 20.

The framework 30 extends in an axial direction of the battery cell 20 and includes:
    first mounting portions (30a and 30b) that protrude outward in a direction perpendicular to the axial direction of the battery cell 20 and are adapted to position and mount the battery cell 20 and the first circuit board 40a; and
    a second mounting portion 30c that protrudes outward in the axial direction of the battery cell 20 and is adapted to position and mount second circuit board 40b.

The second circuit board 40b is communicatively connected to the first circuit board 40a.

The first circuit board 40a is the main control board of the battery pack and has functions such as BMS management. The second circuit board 40b is the secondary board and is provided with a wake-up switch and/or light beads, and other electronic components.

In the technical solution, the battery cell, the framework, and the first circuit board are connected sequentially in the radial direction of the battery cell, and the framework extends in the axial direction of the battery cell. The framework extends outward in the direction perpendicular to the axial direction of the battery cell and in the axial direction of the battery cell to form the first mounting portion and the second mounting portion, which are respectively adapted to position and mount the battery cell and the first circuit board and position and mount the second circuit board. The second circuit board is communicatively connected to the first circuit board, and the structure is novel and simple.

Figure 13:
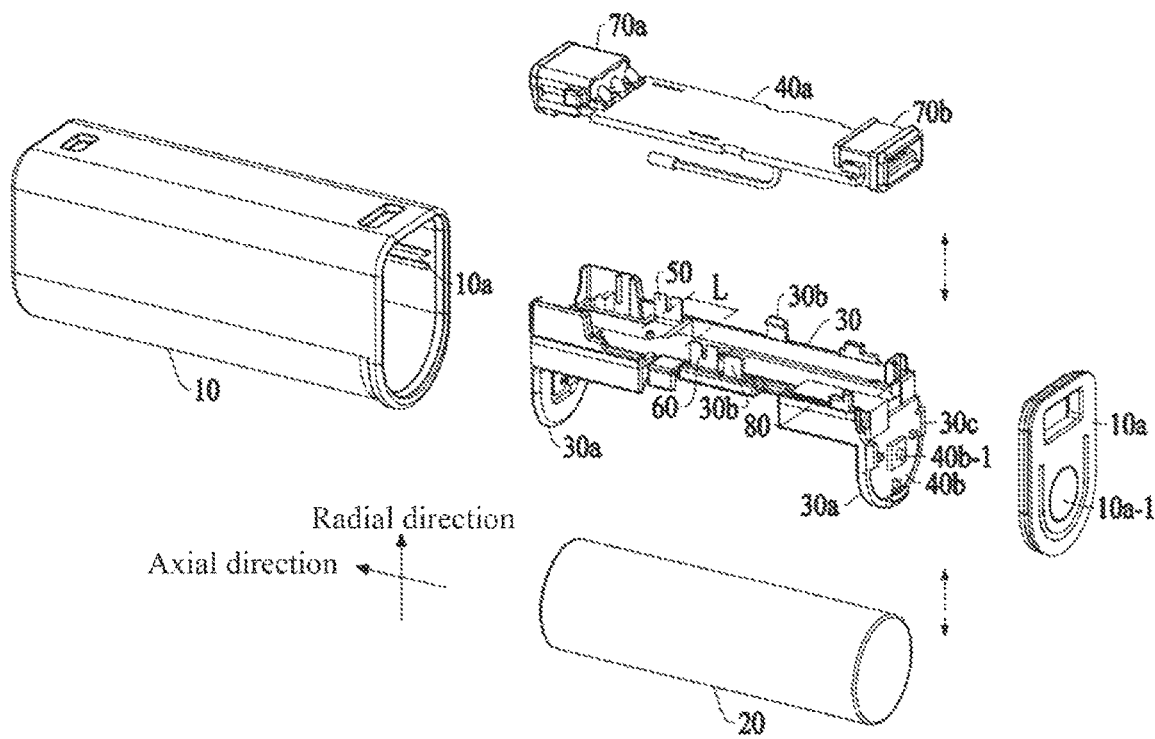
FIG. 13 is an exploded view of the structure of embodiment 3 according to the present disclosure.
Figure 14:
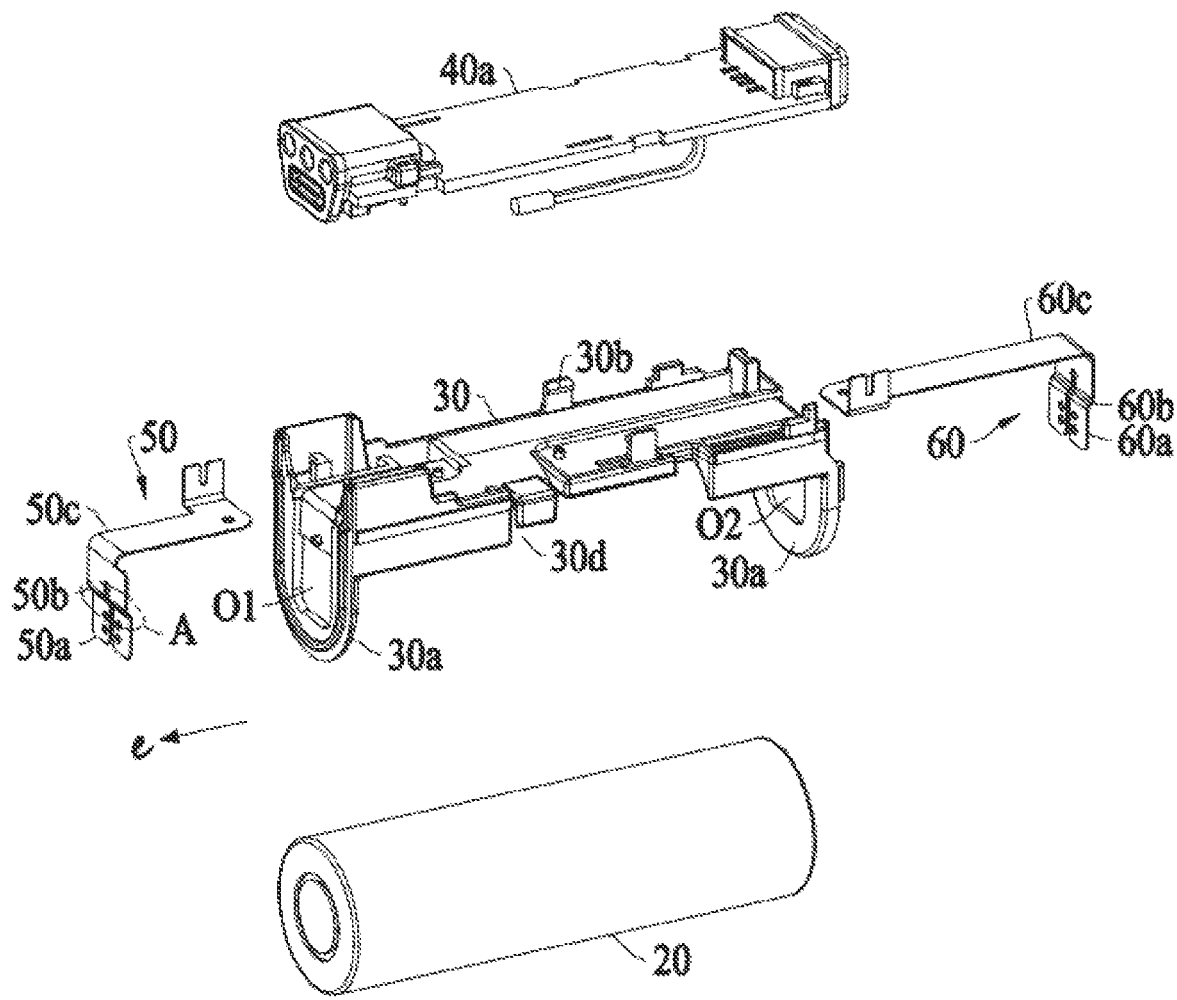
FIG. 14 is an exploded view of a partial structure of embodiment 3 according to the present disclosure.

Specifically, referring to FIGS. 13 and 14, the first mounting portions (30a and 30b) include first portions 30a located at and in contact with two ends of the battery cell 20, where the first portions 30a at least partially cover the ends of the battery cell 20; and second portion 30b located on an edge side of the first circuit board 40a and limited and connected thereto, where the second portion 30b limits and connects to the first circuit board 40a, such that the first circuit board 40a is spaced apart from the framework 30.

The first portions 30a are disposed at two ends of the axial direction of the battery cell 20, and the spacing between them matches the axial length of the battery cell 20. The battery cell 20 is limited in the axial direction by the first portions 30a at the two ends. In addition, the height of the first portions 30a in the radial direction of the battery cell 20 preferably matches the height of the radial end surface of the battery cell 20.

The second portion 30b preferably adopts a lock structure to directly fix and limit the first circuit board 40a to the framework 30. Certainly, the framework 30 is correspondingly provided with a mounting position for the first circuit board 40a. After the circuit board matches the mounting position, the protruding lock structure 30b fixes the circuit board to the framework 30.

As mentioned above, the battery cell 20 is limited by the framework 30, and the positive and negative electrodes of the battery cell 20 are connected to the first circuit board 40 through the first electrical connector 50 and the second electrical connector 60. Two terminals of each of the first electrical connector 50 and the second electrical connector 60 are fixedly connected or welded to the battery cell 20 and the circuit board 40 to limit and connect the battery cell 20 to the framework 30.

The battery cell 20 preferably adopts the 21700 battery or the 18650 battery. The first electrical connector 50 and the second electrical connector 60 are made of conductive materials, preferably nickel sheets, and the first electrical connector 50 and the second electrical connector 60 are preferably connected to the positive and negative electrodes of the battery cell through spot welding.

The first electrical connector 50 and the second electrical connector 60 not only are electrically connected but also limited and fixed.

Still referring to FIGS. 13 and 14, the first electrical connector 50 and the second electrical connector 60 extend in opposite directions along the axial direction of the battery cell 20.

The battery cell 20 is positioned inside the framework 30, and the framework 30 is provided with connection openings O1 and O2 corresponding to two electrodes of the battery cell 20. Starting terminals of the first electrical connector 50 and the second electrical connector 60 are electrically connected to the two electrodes of the battery cell 20 at the connection openings O1 and O2. Specifically, the first electrical connector 50 and the second electrical connector 60 adopt nickel sheets and are spot welded to the electrodes of the battery cell 20, and a spot-welded portion is shown as spot welded segment 50a in FIG. 14.

Then, the first electrical connector 50 and the second electrical connector 60 each extends in an outward transverse direction e and bends to attach to the outer surface of the framework 30 and extends toward the first circuit board 40a to connect with the first circuit board 40a. The first electrical connector 50 and the second electrical connector 60 each extends in the outward transverse direction e and bends to form transverse extension and bending segment 50b, as shown in area A in FIG. 14.

Through the above structural design, the first electrical connector 50 and the second electrical connector 60 are spaced apart from the skin of the battery cell, and the first electrical connector 50 and the second electrical connector 60 are connected to the electrodes of the battery cell 20, which are conductive materials. The support framework 30 in this technical solution is an insulating material. Therefore, the insulating material separates the conductive first electrical connector 50 and the second electrical connector 60 from the skin of the battery cell 20. In this way, even if the skin of the battery cell 20 is broken, no short-circuit accident will occur, thereby achieving insulation protection.

In addition, since the battery pack 100 is suitable for the power tools and great vibration is usually generated during the use of the power tools, when the first electrical connector 50 and the second electrical connector 60 each extends in the outward transverse direction e and bends to form the transverse extension and bending segments, vibration can be effectively attenuated to prevent significant vibration from affecting the internal structure during the use of the power tools.

Figure 12:
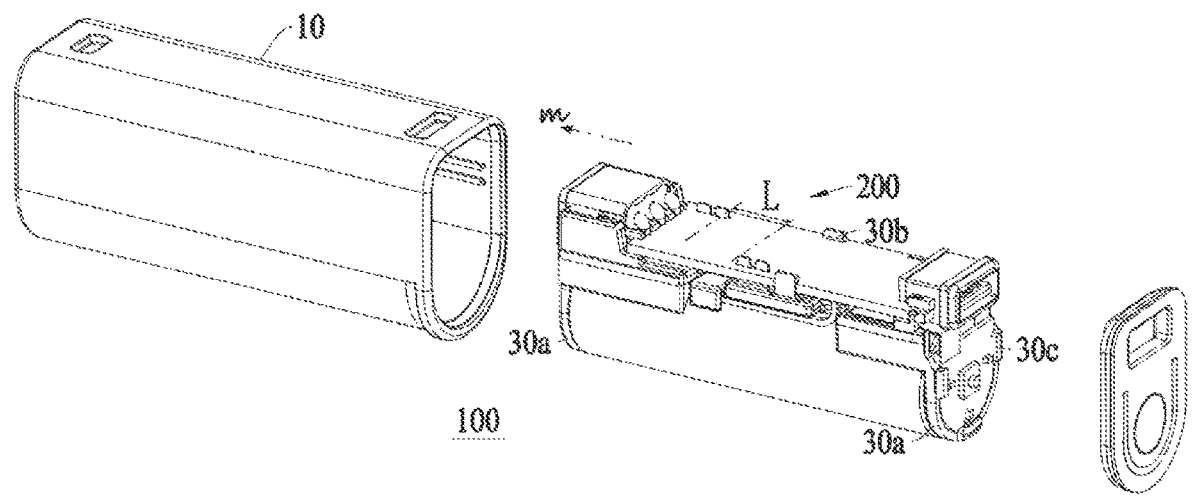
FIG. 12 is a schematic diagram of a structure of embodiment 3 according to the present disclosure.

Referring to FIGS. 12 and 13, the second mounting portion 30c is located on the edge side of the second circuit board 40b and is limited and connected to the second circuit board 40b. The second mounting portion 30c preferably adopts the lock structure.

In addition, the second mounting portion 30c is adjacent to the end of the battery cell 20. Specifically, the second mounting portion 30c is formed on the outer surface of the first portion 30a, that is, the outer surface of the first portion 30a protrudes outward to form the second mounting portion 30c.

The second mounting portion 30c is arranged at the first portion 30a of the first mounting portions (30a and 30b), and the first portions 30a are located at and in contact with the ends of the battery cell 20.

Further, the second mounting portion 30c is located at the edge portion of the first portion 30a to mount and limit the second circuit board 40b.

Figure 15:
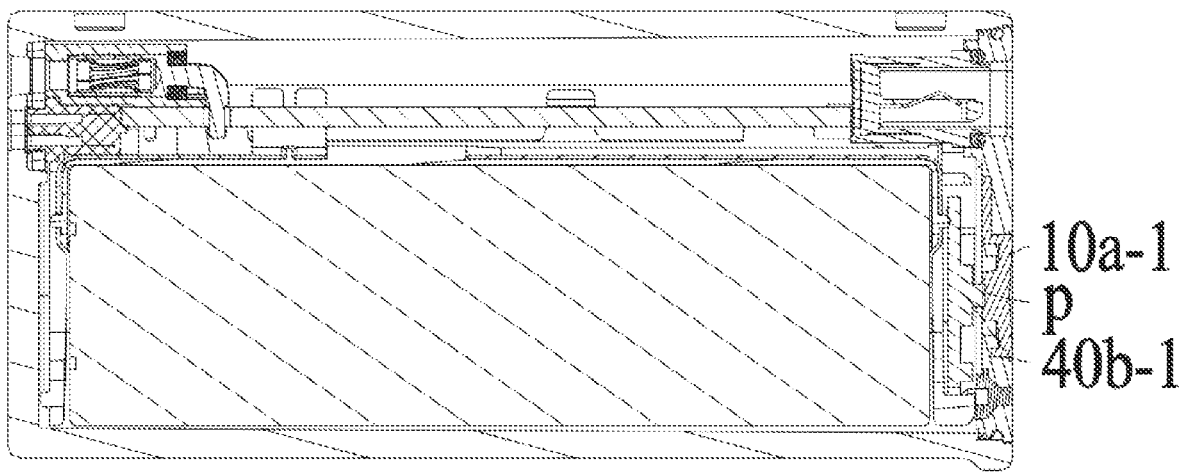
FIG. 15 is a cross-sectional view of the structure of embodiment 3 according to the present disclosure.
Figure 16:
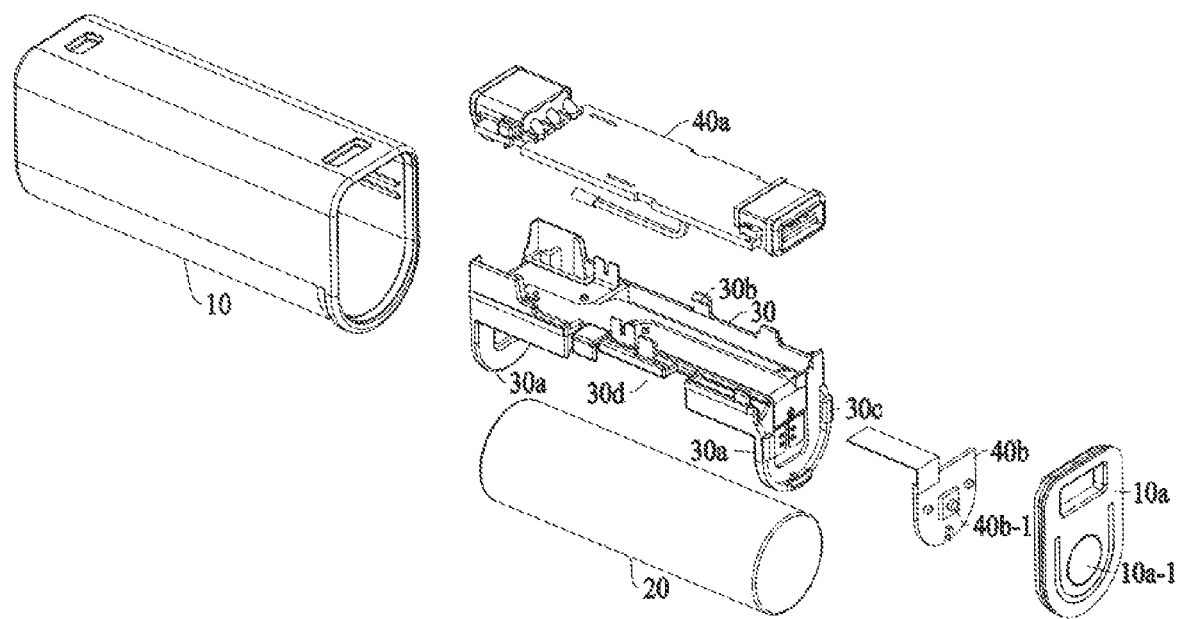
FIG. 16 is an exploded view from another perspective of the structure of embodiment 3 according to the present disclosure.

Referring to FIGS. 15 and 16, the battery pack 100 includes the housing 10 and the battery cell 20, the framework 30, and the first circuit board 40a disposed in the housing 10 and connected sequentially in the radial direction of the battery cell 20.

The framework 30 extends outward in the axial direction of the battery cell 20 to form the second mounting portion 30c.

The second mounting portion 30c is adapted to position, mount, and connect the second circuit board 40b.

The second circuit board 40b is communicatively connected to the first circuit board 40a and includes at least wake-up switch 40b-1.

The housing 10 includes end cover 10a corresponding to the second circuit board 40b. The end cover 10a is provided with button 10a-1 at the position corresponding to the wake-up switch 40*b*-1. The button 10*a*-1 is internally provided with projection p in contact with the wake-up switch 40*b*-1.

In the technical solution, the second circuit board provided with the wake-up switch is disposed in the axial direction of the battery cell. The button is disposed at the corresponding end cover, and the button is internally provided with the projection in contact with the wake-up switch. In this way, when the user operates and uses the battery pack, four fingers hold the surface of the battery pack in the length direction, which is convenient for holding, and the thumb is just correspondingly located at the button, which is convenient for pressing. Therefore, the battery pack is convenient for griping and pressing with one hand.

The button 10*a*-1 is suitable for elastic deformation, and/or the outer surface of the button 10*a*-1 is substantially flush with the outer surface of the end cover 10*a*, as shown in FIG. 15.

The battery pack 100 further includes first mounting portions (30*a* and 30*b*), where the first mounting portions (30*a* and 30*b*) include first portions 30*a* located at and in contact with two ends of the battery cell 20, where the first portions 30*a* at least partially cover the ends of the battery cell 20; and the second portion 30*b* located on the edge side of the first circuit board 40*a* and limited and connected thereto, where the second portion 30*b* limits and connects to the first circuit board 40*a*, such that the first circuit board 40*a* is spaced apart from the framework 30.

The second mounting portion 30*c* is arranged at the first portion 30*a* of the first mounting portions (30*a* and 30*b*) and is limited and connected to the edge side of the second circuit board 40*b*.

Referring to FIG. 16, the battery pack 100 includes the battery cell 20, the framework 30, and the first circuit board 40*a* connected sequentially in the radial direction of the battery cell 20.

The framework 30 extends in the axial direction of the battery cell 20 and in a direction perpendicular to the axial direction of the battery cell 20 to form the first mounting portions (30*a* and 30*b*).

The mounting portions (30*a* and 30*b*) are adapted to position, mount, and connect the battery cell 20 and the first circuit board 40*a*.

The framework 30 further includes arc groove 30*d* located between the first mounting portions (30*a* and 30*b*) and extending in the axial direction of the battery cell 20.

The arc groove 30*d* corresponds to an arc surface of the battery cell 20.

The arc groove 30*d* corresponds to the arc surface of the battery cell 20, and the arc groove 30*d* is combined with the inner wall of the housing 10 to limit the battery cell in the radial direction.

Moreover, the width of the arc groove 30*c* is smaller than the outer diameter of the battery cell 20 to minimize the radial width of the battery pack and the external size of the battery pack.

In the technical solution, the battery cell, the framework, and the first circuit board are connected sequentially in the radial direction of the battery cell, and the framework extends outward in the radial direction of the battery cell, that is, in the direction perpendicular to the axial direction of the battery cell to form the first mounting portions. The arc groove extending in the axial direction of the battery cell is provided between the first mounting portions, and the arc groove corresponds to the arc surface of the battery cell. The first mounting portion limits the battery cell in the axial direction, and the arc groove limits the battery cell in the radial direction.

Finally, it should be noted that the above example is merely intended to describe the technical solutions of the present disclosure, rather than to limit the present disclosure. Although the present disclosure is described in detail with reference to the above example, a person of ordinary skill in the art will understand that modifications can be made to the technical solutions described in the above examples or equivalent replacements can be made to some or all technical features thereof. However, these modifications or replacements do not depart from the scope of the technical solutions of the examples of the present disclosure.

What is claimed is:

1. A battery pack, comprising:
    a housing;
    a battery cell, a framework and a circuit board that are connected sequentially in a radial direction of the battery cell;
    a first electrical connector and a second electrical connector that are respectively arranged at positive and negative electrodes in an axial direction of the battery cell and separately connected to the circuit board;
    a transverse extension and bending segment, wherein the first electrical connector and the second electrical connector each extends in an outward transverse direction and bends to attach to an outer surface of the framework and extends toward the circuit board to connect with the circuit board, and wherein the first electrical connector and the second electrical connector each extends in the outward transverse direction and bends to form the transverse extension and bending segment; and
    a third electrical connector that is connected to the circuit board and configured to be electrically connected to an electrical device to supply power from the battery cell to the electrical device through the third electrical connector,
    wherein the battery cell, the framework and the circuit board that are integrally connected, the first electrical connector, the second electrical connector, and the third electrical connector are in a limiting slide fit with an inner cavity of the housing,
    wherein the framework comprises mounting portions,
    wherein the mounting portions connect directly to the battery cell and directly to the circuit board, and
    wherein the battery pack further comprises a fourth electrical connector, and the circuit board is provided with a corresponding mounting opening for the fourth electrical connector, and wherein when the fourth electrical connector is inserted in the mounting opening, the fourth electrical connector is substantially flush with an upper surface of the circuit board.

2. The battery pack according to claim 1, wherein the battery cell, the framework and the circuit board that are integrally connected, the first electrical connector, the second electrical connector, and the third electrical connector are in the limiting slide fit with the inner cavity of the housing in a length direction.

3. The battery pack according to claim 1, wherein the framework is provided with a protruding slide key linearly extending in a length direction of the framework, and an inner wall of the housing is correspondingly provided with a matching slide groove; or
    the framework is provided with a recessed slide groove linearly extending in the length direction of the framework, and the inner wall of the housing is correspondingly provided with a matching protruding slide key.

4. The battery pack according to claim 1, wherein the first electrical connector and the second electrical connector each transversely extend outward and bend to an outer surface of the framework and extend toward the circuit board to connect with the circuit board.

5. The battery pack according to claim 4, wherein the first electrical connector and the second electrical connector comprise extension segments extending in opposite directions along the axial direction of the battery cell, respectively, and the extension segments are maintained at a spacing of at least 2 mm from the circuit board.

6. The battery pack according to claim 4, wherein the first electrical connector and the second electrical connector comprise extension segments extending in opposite directions along the axial direction of the battery cell, respectively, and the extension segments are spaced apart from each other at a spacing of not less than 3 mm.

7. The battery pack according to claim 5, wherein the extension segments are maintained at a spacing of not greater than 4 mm from the circuit board.

8. The battery pack according to claim 1, wherein the framework extends in the axial direction of the battery cell and extends outward and protrudes in a direction perpendicular to the axial direction of the battery cell to form the mounting portions;
the mounting portions are adapted to position, mount, and connect the battery cell and the circuit board, respectively;
the framework further comprises an arc groove located between the mounting portions and extending in the axial direction of the battery cell; and
the arc groove corresponds to an arc surface of the battery cell.

9. The battery pack according to claim 8, wherein a width of the arc groove is shorter than an outer diameter of the battery cell.

10. A battery pack, comprising:
a housing;
a battery cell, a framework and a circuit board that are connected sequentially in a radial direction of the battery cell;
a first electrical connector and a second electrical connector that are respectively arranged at positive and negative electrodes in an axial direction of the battery cell and separately connected to the circuit board;
a transverse extension and bending segment, wherein the first electrical connector and the second electrical connector each extends in an outward transverse direction and bends to attach to an outer surface of the framework and extends toward the circuit board to connect with the circuit board, and wherein the first electrical connector and the second electrical connector each extends in the outward transverse direction and bends to form the transverse extension and bending segment; and a third electrical connector that is connected to the circuit board and configured to be electrically connected to an electrical device to supply power from the battery cell to the electrical device through the third electrical connector,
wherein the framework is in a limiting slide fit with an inner cavity of the housing,
wherein the framework comprises mounting portions,
wherein the mounting portions connect directly to the battery cell and directly to the circuit board, and
wherein the battery pack further comprises a fourth electrical connector, and the circuit board is provided with a corresponding mounting opening for the fourth electrical connector, and wherein when the fourth electrical connector is inserted in the mounting opening, the fourth electrical connector is substantially flush with an upper surface of the circuit board.

11. The battery pack according to claim 10, wherein the battery cell, the framework, the circuit board, the first electrical connector, the second electrical connector, and the third electrical connector are integrally connected.

12. The battery pack according to claim 10, wherein the framework is provided with a protruding slide key linearly extending in a length direction of the framework, and an inner wall of the housing is correspondingly provided with a matching slide groove; or
the framework is provided with a recessed slide groove linearly extending in the length direction of the framework, and the inner wall of the housing is correspondingly provided with a matching protruding slide key.

13. The battery pack according to claim 2, wherein the framework is provided with a protruding slide key linearly extending in a length direction of the framework, and an inner wall of the housing is correspondingly provided with a matching slide groove; or
the framework is provided with a recessed slide groove linearly extending in the length direction of the framework, and the inner wall of the housing is correspondingly provided with a matching protruding slide key.

14. The battery pack according to claim 11, wherein the framework is provided with a protruding slide key linearly extending in a length direction of the framework, and an inner wall of the housing is correspondingly provided with a matching slide groove; or
the framework is provided with a recessed slide groove linearly extending in the length direction of the framework, and the inner wall of the housing is correspondingly provided with a matching protruding slide key.

15. The battery pack according to claim 1, wherein the fourth electrical connector has a bi-directional charge/discharge interface.

16. The battery pack according to claim 10, wherein the fourth electrical connector has a bi-directional charge/discharge interface.

* * * * *